United States Patent
Gronau et al.

(10) Patent No.: US 8,038,228 B2
(45) Date of Patent: Oct. 18, 2011

(54) METHOD FOR CONTROLLING THE PRESSURE BUILDUP IN AN ELECTRONICALLY CONTROLLABLE BRAKE SYSTEM

(75) Inventors: Ralph Gronau, Wetter (DE); Tobias Scheller, Hofbieber (DE); Ralf Revoil, Dietzenbach-Steinberg (DE); Andreas Neu, Kuhardt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 1392 days.

(21) Appl. No.: 10/584,031

(22) PCT Filed: Dec. 17, 2004

(86) PCT No.: PCT/EP2004/053584
§ 371 (c)(1),
(2), (4) Date: Jun. 22, 2006

(87) PCT Pub. No.: WO2005/063541
PCT Pub. Date: Jul. 14, 2005

(65) Prior Publication Data
US 2007/0164605 A1    Jul. 19, 2007

(30) Foreign Application Priority Data
Dec. 24, 2003   (DE) .................................. 103 61 241

(51) Int. Cl.
*B60T 8/44* (2006.01)
(52) U.S. Cl. ................................ 303/114.3; 303/113.3
(58) Field of Classification Search .................. 303/191, 303/12, 113.3, 113.4, 114.3, 115.3, 116.1, 303/116.2, 155; 188/356, DIG. 1; 60/538, 60/562, 547
See application file for complete search history.

(56) References Cited

U.S. PATENT DOCUMENTS

| 5,842,751 | A  | * | 12/1998 | Unterforsthuber | 303/115.3 |
| 5,938,297 | A  | * | 8/1999  | Whaite et al.   | 303/114.3 |
| 5,954,406 | A  | * | 9/1999  | Sawada          | 303/122.09 |
| 6,318,815 | B1 | * | 11/2001 | Haupt et al.    | 303/113.4 |
| 6,361,126 | B1 | * | 3/2002  | Pueschel et al. | 303/114.3 |
| 6,450,589 | B2 | * | 9/2002  | Dieringer et al.| 303/114.1 |
| 6,715,846 | B1 | * | 4/2004  | Pueschel et al. | 303/114.3 |
| 7,267,412 | B2 | * | 9/2007  | Gronau et al.   | 303/114.3 |
| 2004/0251739 | A1 | * | 12/2004 | Quirant et al. | 303/155 |

FOREIGN PATENT DOCUMENTS

| DE | 19825110 | 2/2000 |
| DE | 19925783 | 12/2000 |
| DE | 19925794 | 12/2000 |
| DE | 10022957 | 11/2001 |
| DE | 10156401 | 8/2002 |
| EP | 0754607  | 1/1997 |
| FR | 2829451  | 3/2003 |

* cited by examiner

*Primary Examiner* — Robert Siconolfi
*Assistant Examiner* — Mariano Sy

(57) ABSTRACT

In a method for controlling the pressure buildup in an electronically controllable brake system, preferably for use in motor vehicles, including a master brake cylinder, in particular a tandem master brake cylinder (TMC), a vacuum brake booster (booster), at least one additional pressure source for brake force assistance, preferably a hydraulic pump which is drivable by a controlling unit and the pressure of which can be applied to wheel brakes of the vehicle, an approach of a point where the auxiliary-force to actuating-force ratio (operating point) of the vacuum brake booster (booster) falls below a predetermined ratio is detected, that a pressure gradient in the master brake cylinder (TMC pressure gradient) is detected, and that in the event of a detected approach of the operating point of the booster and when a pressure gradient limit value of the detected TMC pressure gradient is exceeded, the additional pressure source is activated for brake force assistance, for the purpose of building up additional brake pressure.

7 Claims, No Drawings

METHOD FOR CONTROLLING THE PRESSURE BUILDUP IN AN ELECTRONICALLY CONTROLLABLE BRAKE SYSTEM

This application is the U.S. national phase of international application PCT/EP04/53584 filed Dec. 17, 2004, which designated the U.S. and which claims the benefit of priority of German Patent Application Number 10 361 241.6 filed Dec. 24, 2003. The contents of each of the aforementioned documents are incorporated herein in their entirety.

BACKGROUND OF THE INVENTION

The invention relates to a method for controlling the pressure buildup in an electronically controllable brake system, preferably for use in motor vehicles, including a master brake cylinder, in particular a tandem master brake cylinder (TMC), a vacuum brake booster (booster), at least one additional pressure source for brake force assistance, preferably a hydraulic pump which is drivable by a controlling unit and the pressure of which can be applied to wheel brakes of the vehicle.

The invention also relates to a device for controlling the pressure buildup in an electronically controllable brake system preferably for use in motor vehicles, including a master brake cylinder, a vacuum brake booster (booster), at least one additional pressure source provided with a pump which is drivable by a controlling unit and the pressure of which can be applied to wheel brakes of the vehicle.

The invention further relates to a hydraulic motor vehicle brake system.

Vacuum brake boosters require vacuum supply from the motor in order to assist the pedal force that has to be generated by the driver. Depending on the vacuum supply, defined pedal forces will produce a condition where further increase of the force applied to the actuating unit is only possible by augmenting the pedal force because the vacuum brake booster has reached the maximum possible boosting force. This condition is referred to as operating point of the booster.

Additional brake force assistance is required in case the maximally attainable boosting force is insufficient due to an only weak vacuum supply, which occurs at an increasing rate as regards new engine technology such as gasoline direct injection engines or Diesel engines. One possibility of generating additional brake force or additional brake pressure is the use of 'active' hydraulic brake force assistance. This is achieved e.g. by means of a hydraulic pump. The hydraulic pressure, which results in the hydraulic master brake cylinder from the brake force that is introduced by the driver by way of depression of the brake pedal and boosted by means of a vacuum brake booster, is increased in addition by the hydraulic pump. This pump is driven by an electric motor being actuated by an electronic brake control unit.

EP 0 754 607 A1 discloses a brake system with a brake booster and a hydraulic brake control system for vehicles which can generate a pressure that is higher than the pressure introduced. The system is characterized by an evaluation device which identifies when an auxiliary-force to actuating-force ratio (operating point of a booster) falls below a predetermined ratio, by a controlling device which generates a nominal pressure in the wheel brakes by means of the hydraulic brake control system after this ratio has fallen below the predetermined ratio, and by a nominal pressure bringing about, at least in part, a compensation of the effects of an auxiliary force available in relation to the actuating force.

It is a problem in these systems to present an 'analog' transition to brake force assistance because only a stepped pressure increase occurs due to valve switching operations or pump operations. The reason is that the valve switching operations and/or pump operations which are necessary for active pressure increase can be executed only when an assessable deviation has developed.

The development of a feeling of a 'hard' pedal is not only caused due to 'waiting for' a deviation but also occurs with driver specifications (pressure increases) having a raised gradient. The time frame, which is shorter as a result of the increased actuating speed, is not sufficient to compensate the pressure in the vacuum chamber, which rises due to the space decreasing, by way of the available vacuum (low engine vacuum) which is reduced anyway. This means that the pressure difference over the membrane in the vacuum brake booster is lower than would be the case e.g. with a quasi-stationary gradient. Thus, the actuating forces of the brake are too high for the driver.

In addition, a system-induced starting behavior of the pump will also become more conspicuous with increasing depression speed in terms of a time delay as regards the active pressure buildup. The result is that the above-mentioned feeling of a 'hard pedal' will be noticed to a stronger degree and influence negatively the feeling of comfort and the possible actuating speed of the driver when braking.

An object of the invention involves providing a method and a device allowing an improved control of the pressure buildup in an electronically controllable brake system.

SUMMARY OF THE INVENTION

In a method for controlling the pressure buildup in an electronically controllable brake system, preferably for use in motor vehicles, including a master brake cylinder, in particular a tandem master brake cylinder (TMC), a vacuum brake booster (booster), at least one additional pressure source for brake force assistance, preferably a hydraulic pump which is drivable by a controlling unit and the pressure of which can be applied to wheel brakes of the vehicle, it is provided according to the invention that an approach of a point where the auxiliary-force to actuating-force ratio (operating point) of the vacuum brake booster (booster) falls below a predetermined ratio is detected, that a pressure gradient in the master brake cylinder (TMC pressure gradient) is detected, and that in the event of a detected approach of the operating point of the booster and when exceeding a pressure gradient limit value of the detected TMC pressure gradient, the additional pressure source is activated for brake force assistance, for the purpose of building up additional brake pressure.

The term 'operating point' is defined herein especially by the brake pressure at which the predetermined ratio between the auxiliary force and the actuating force is not reached. Thus, an 'operating point-brake pressure value' is also implied.

Due to this method, the brake pressure is defined and adjusted (boosting) already before a deviation develops. Upon increase of the pedal force which the driver applies to the brake pedal (pedal force), it is possible to increase the pressure in the system and, hence, the wheel brake pressure with a corresponding factor without (noticeable) delay. A feeling of a 'hard' pedal for the driver will not occur. Instead, the comfortable pedal feeling to which the driver is used, is almost maintained, like in the case of assistance solely by the booster.

It is provided according to the invention that the pressure gradient limit value lies in a range of 150 bar/s up to 250 bar/s, preferably at 190 bar/s up to 210 bar/s, and amounts to roughly 200 bar/s in particular.

It is arranged for according to the invention that the additional pressure source for brake force assistance is actuated when it has been detected that the pressure gradient limit value is exceeded for a predetermined or established minimum time, which lies in a range of 10 ms to 100 ms, preferably 20 ms to 40 ms, and more particularly amounts to roughly 30 ms.

When an approach of the operating point of the booster is detected and the pressure gradient limit value of the established TMC pressure gradient is exceeded, in a particularly favorable embodiment of the invention, a predetermined or calculated, preferably a calculated operating point of the booster will be lowered by a predetermined or established appropriate operating point reduction value, that means an operating point-reduction pressure value, and thus a corrected operating point, i.e. a corrected operating point-brake pressure value, is established which causes activation of the additional pressure source for the purpose of building up additional brake pressure.

Favorably, deviations will not be produced this way, but rather a 'smooth' transition of the pressure increase by the booster and of the additional assistance by the hydraulic pump is achieved. This condition will enable a sufficient rate of boosting as well as quick boosting, while preventing a noticeable transition in brake force boosting at the pedal for the driver in addition.

When reaching the operating point, it is arranged to adjust the assistance by the hydraulic pump, i.e. a suitable pump rotational speed, which conforms to the brake application of the driver, i.e. to his 'pedal depression', rather than to impair the brake pedal feeling due to the starting behavior of the pump. According to the invention, the starting behavior of the pump is 'concealed' by a shift into the phase during brake pressure build up which is still assisted by the booster, that means the pedal feeling is preserved for the driver also during start of the pump (for assistance by the hydraulic pump).

According to the invention, pressure in the master brake cylinder (TMC pressure) is established and used as a control command representative of a driver specification for brake pressure control, and the additional pump is activated for the purpose of building up additional brake pressure when the TMC pressure exceeds the operating point (being 'advanced' according to the invention) or the operating point-brake pressure value (being 'advanced' according to the invention), and/or the corrected operating point of the booster.

It is provided according to the invention that the operating point of the booster is considered as constant for brake pressure control when, in the course of a continuous brake pressure increase, the operating point which is reduced by the operating-point reduction value (corrected operating point) is reached, or is not reached.

According to the invention, the operating point of the booster is continuously calculated, and a detected change of the calculated operating point of the booster is likewise taken into account when finding out a predetermined or established appropriate operating-point reduction value.

It is provided in an embodiment that the approach of the operating point of the booster is established or estimated according to a stored calibrated booster characteristic curve.

The object is also achieved by a device for controlling pressure buildup in an electronically controllable brake system for preferably motor vehicles, including a master brake cylinder, a vacuum brake booster (booster), at least one additional pressure source having a pump which is drivable by a controlling unit and the pressure of which can be applied to wheel brakes of the vehicle, in particular for implementing the method of the invention, in which provisions are made that the controlling unit includes a detecting and actuating unit for establishing an approach of a point where a predetermined ratio between the auxiliary force and the actuating force (operating point) of the vacuum brake booster (booster) and of a pressure gradient in the master brake cylinder (TMC pressure gradient) is not reached, and for activating the additional pressure source for the purpose of building up additional brake pressure when a predetermined or established pressure gradient limit value of the established TMC pressure gradient is exceeded in the event of a detected approach of the operating point of the booster.

Preferably at least one hydraulic pump, either alone or in combination with a hydraulic pressure accumulator, is used as a pump for the additional pressure source.

The object is likewise achieved by a hydraulic motor vehicle brake system equipped with an electronic control with a device according to the invention.

The invention is explained in detail by way of an embodiment.

DETAILED DESCRIPTION OF AN EMBODIMENT

A motor vehicle includes a hydraulic brake system equipped with an electronic control with a device according to the invention. A brake controlling unit is used to evaluate an established TMC pressure gradient below the operating point of the booster.

Monitoring of the gradient is preferably commenced with a TMC pressure higher than 3 bar. When the gradient exceeds the value of preferably roughly 200 bar/s, and if this gradient prevails at least for a time of e.g. three runs of a controller program (controller loop), meaning a time of preferably 30 ms in this embodiment, the calculated operating point is lowered by an appropriate value, favorably roughly 5 bar, and a corrected operating point is this way fixed. The value of the reduction is chosen in such a fashion that when the TMC pressure, which applies as a command variable or the value of the driver's specification, exceeds the operating point, it is safeguarded that the pump which is responsible for the active buildup is activated (full activation) corresponding to the driver's instructions to brake (his 'brake pedal depression').

The operating point or the operating-point brake pressure value, respectively, is maintained constant when, in the course of a continuing pressure increase, the 5-bar threshold between the nominal pressure, i.e. a calculated pressure specification commencing with the exceeding of the operating point and the operating point or operating-point brake pressure value, respectively, is reached or exceeded.

The 'rough value' of the operating point, which does not include an offset, i.e. the operating point without the reduction, is continued being calculated in the background. When this continuously established value of the operating point re-increases because the brake pedal is released or is maintained constant, likewise the corrected, offset-afflicted operating point will be further increased when the operating point is reached in order to safeguard a harmonious transition in the event of exiting from the control of brake pressure increase by means of the pump.

The result is an early activation of the pump and, at the same time, an activation that is in conformity with the requirement of the prevailing gradient. Advantageously, this fact enables a noticeably improved pedal feeling, i.e. a remarkably less 'hard pedal' until reaching the limits of the active pressure buildup by means of the pump.

The invention claimed is:

1. A method for controlling the pressure buildup in an electronically controllable automotive brake system, where the brake system includes a tandem master brake cylinder, a vacuum brake booster, and at least one additional pressure source for brake force assistance, which is drivable by a controlling unit and the pressure of which can be applied to wheel brakes of the vehicle, the method comprising the steps of detecting an approach of an operating point defined by a minimum predetermined ratio between the auxiliary force of the vacuum brake booster and the actuating force, detecting a pressure gradient in the master brake cylinder, and, in the event of a detected approach of the operating point of the vacuum brake booster and when a pressure gradient limit value of the detected master brake cylinder pressure gradient is exceeded, lowering the operating point of the vacuum booster by a predetermined operating point-reduction pressure value when an approach of the operating point of the vacuum brake booster is detected and the pressure gradient limit value of the established master brake cylinder pressure gradient is exceeded, and thus establishing a corrected operating point, replacing the operating point, which corrected operating point causes activation of the additional pressure source for the purpose of building up additional brake pressure.

2. The method as claimed in claim 1,
 wherein the pressure gradient limit value is in a range from 150 bar/s to 250 bar/s.

3. The method as claimed in claim 1, wherein the additional pressure source for brake force assistance is activated when the pressure gradient limit value is exceeded for a minimum time period in the a range of 10 ms to 100 ms.

4. The method as claimed in claim 1,
 wherein the operating point of the vacuum brake booster for brake pressure control is considered constant when, in the course of a continuous brake pressure increase, the operating point is reached or is not approached.

5. The method as claimed in any one of claim 1, comprising the step of
 continuously calculating the operating point of the vacuum brake booster,
 wherein the operating point reduction value is established by taking into account a detected change of the calculated operating point of the vacuum brake booster.

6. The method as claimed in any one of claim 1, comprising the step of
 determining a pressure in the tandem master brake cylinder as a control command representative of a driver specification for brake pressure control, wherein the additional pressure source is activated when the pressure in the tandem master brake cylinder exceeds the corrected operating point.

7. The method as claimed in any one of claim 1,
 wherein the approach of the operating point of the vacuum brake booster is detected according to a stored calibrated booster characteristic curve.

\* \* \* \* \*